US012008277B2

(12) United States Patent
Takeda

(10) Patent No.: US 12,008,277 B2
(45) Date of Patent: Jun. 11, 2024

(54) IMAGE FORMING APPARATUS WITH HAVING MULTI-FACTOR AUTHENTICATION FUNCTION EXECUTABLE FOR ANY KIND OF REMOTE ACCESS FOR USING IMAGE PROCESSING FUNCTIONS OF THE IMAGE FORMING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Kyohei Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 17/579,344

(22) Filed: Jan. 19, 2022

(65) Prior Publication Data

US 2022/0236933 A1 Jul. 28, 2022

(30) Foreign Application Priority Data

Jan. 27, 2021 (JP) ................................. 2021-011290

(51) Int. Cl.
*G06F 3/12* (2006.01)
*H04L 9/40* (2022.01)
*H04W 12/06* (2021.01)

(52) U.S. Cl.
CPC .......... *G06F 3/1238* (2013.01); *G06F 3/1222* (2013.01); *H04L 63/101* (2013.01); *H04L 2463/082* (2013.01); *H04W 12/068* (2021.01)

(58) Field of Classification Search
None
See application file for complete search history.

(56) References Cited

U.S. PATENT DOCUMENTS

| 2013/0222840 A1* | 8/2013 | Hosoda ................ H04N 1/0084 358/1.14 |
| 2019/0141214 A1* | 5/2019 | Matsumoto ............ H04N 1/442 |
| 2021/0303241 A1* | 9/2021 | Pinney .................. G06F 21/608 |
| 2022/0239799 A1* | 7/2022 | Hosoda ................... G06F 21/32 |
| 2023/0084993 A1* | 3/2023 | Takeda ................... H04W 12/06 726/6 |

FOREIGN PATENT DOCUMENTS

| JP | 2019155610 A | 9/2019 |
| JP | 6590056 B2 | 10/2019 |

\* cited by examiner

*Primary Examiner* — Haris Sabah
(74) *Attorney, Agent, or Firm* — Canon U.S.A., Inc. IP Division

(57) ABSTRACT

An image forming apparatus performs processing, which is different from multi-factor authentication processing, on remote access to a function on which the multi-factor authentication processing cannot be performed. In this way, remote access to an image processing function is enabled without performing the multi-factor authentication processing on the remote access.

10 Claims, 11 Drawing Sheets

FIG.5

MANAGEMENT OF USER INFORMATION ~501

[REGISTER] [EDIT] [DELETE]

| | USER NAME | ROLE | MAIL |
|---|---|---|---|
| ☐ | Admin | Administrator | admin@canon.com |
| ☐ | Alice | Administrator | alice@canon.com |
| ☐ | Bob | GeneralUser | bob@canon.com |
| ☐ | Carol | GeneralUser | carol@canon.com |
| ☐ | Dave | LimitedUser | dave@canon.com |

EDITING OF USER INFORMATION ~502

USER NAME: Alice

PASSWORD: [********]

PERSONAL IDENTIFICATION NUMBER: [******]

CARD ID: [44E7158E...]

ROLE: [Administrator ▽]

MAIL ADDRESS: [alice@canon.com]

ONE-TIME PASSWORD: STATE: ENABLE  [DISABLE] 503

APPLICATION PASSWORD: 504

STORAGE SERVICE: STATE: GENERATED [DELETE]

PRINT SERVICE: STATE: NOT GENERATED

IMAGE FORMING APPARATUS WITH HAVING MULTI-FACTOR AUTHENTICATION FUNCTION EXECUTABLE FOR ANY KIND OF REMOTE ACCESS FOR USING IMAGE PROCESSING FUNCTIONS OF THE IMAGE FORMING APPARATUS, CONTROL METHOD, AND NON-TRANSITORY COMPUTER-READABLE STORAGE MEDIUM

BACKGROUND

Field of the Disclosure

The present disclosure relates to an image forming apparatus having a multi-factor authentication function, a control method of the image forming apparatus, and a storage medium.

Description of the Related Art

In recent years, cyberattacks have become more sophisticated, and introduction of multi-factor authentication has been advancing as countermeasures against these cyberattacks. Three elements, which are "knowledge information", "possession information", and "biological information", are used as elements of the multi-element authentication. The "knowledge information" is information known only to the person in question, and is, for example, a password, a personal identification number, or the like. The "possession information" is an integrated circuit (IC) card or a hardware token (one-time password) possessed only by the person in question. The "biometric information" refers to biological information or characteristics unique to the person in question, such as a fingerprint, a vein, or a face.

Such multi-factor authentication in which authentication is performed by combining at least two of these "knowledge information", "possession information", and "biological information" can be used as countermeasures against cyberattacks on a system and can reduce the risk of unauthorized use of the system. There is proposed a user authentication method performed when a user uses an operation panel of an image forming apparatus installed in an office. In this method, user authentication is performed by using an IC card distributed as an employee identification (ID) card. Since the user authentication is completed only by holding up the IC card, the method is convenient and has widely spread. In addition, there is an image forming apparatus that performs multi-factor authentication processing by combining, for example, an IC card as "possession information" and biometric authentication as "biometric information" (see Japanese Patent Application Laid-Open No. 2019-155610).

Further, the image forming apparatus includes a web server function that can be accessed from a web browser of a personal computer (PC) terminal. Thus, a user can remotely access the image forming apparatus by using the web browser of the PC terminal and can operate a user interface created in Hypertext Markup Language (HTML). Hereinafter, a user interface displayed in HTML will be referred to as a remote user interface (UI). In general, the "knowledge information" such as an ID or a password is used as a method of authenticating a user who uses a remote UI provided by an image forming apparatus.

Further, the image forming apparatus supports various protocols so that image processing functions can be used. Authentication processing is performed on remote access other than the remote access to the remote UI.

Examples of the authentication processing includes authentication based on Internet Printing Protocol (IPP) and authentication based on server message block (SMB) for sharing document files in an image forming apparatus. In general, the "knowledge information" such as an ID and a password is used as a method of authenticating a user using these image processing protocols (see Japanese Patent No. 06590056).

Conventional techniques do not assume that multi-factor authentication processing is performed on remote access for using an image forming apparatus. In view of this, authentication processing using multi-factor authentication processing is provided for remote access for using an image forming apparatus. However, the multi-factor authentication processing is not always executable for any kind of remote access. For example, since Mopria®, which is a print protocol using IPP, does not support multi-factor authentication at the time of filling of the application, multi-factor authentication cannot be applied to remote access to image processing functions. Therefore, such remote access to image processing functions needs to be handled in some way differently from multi-factor authentication.

SUMMARY

According to exemplary embodiments of the present disclosure, an image forming apparatus performs processing, which is different from multi-factor authentication processing, on remote access to a function on which the multi-factor authentication processing cannot be performed. Thus, there is provided an image forming apparatus that enables remote access to an image processing function without performing multi-factor authentication processing on the remote access to the image processing function.

According to embodiments of the present disclosure, an image forming apparatus that includes a plurality of functions including at least a remote user interface (UI) function and an image processing function and that allows a user to use the plurality of functions upon accepting remote access from a terminal includes an authentication unit configured to perform authentication processing on remote access to the remote UI function and remote access to the image processing function, wherein, in a case where the user remotely accesses the remote UI function, the image forming apparatus allows the user to use a function of the image forming apparatus by performing multi-factor authentication processing, and wherein, in a case where the user remotely accesses the image processing function that does not support multi-factor authentication, the image forming apparatus allows the user to use a function of the image forming apparatus by performing processing different from the multi-factor authentication processing.

Further features of the present disclosure will become apparent from the following description of exemplary embodiments with reference to the attached drawings.

BRIEF DESCRIPTION OF THE DRAWINGS

FIG. 5 illustrates a user interface for user management.

DESCRIPTION OF THE EMBODIMENTS

Hereinafter, exemplary embodiments of the present disclosure will be described with reference to the drawings.

As an example of an image forming apparatus, an exemplary embodiment of the present disclosure will be described using, as an example, a multifunction peripheral (MFP) that is installed in an office and that has a plurality of image processing functions such as copy, print, and scan functions.

<System Configuration>

Figure 1:
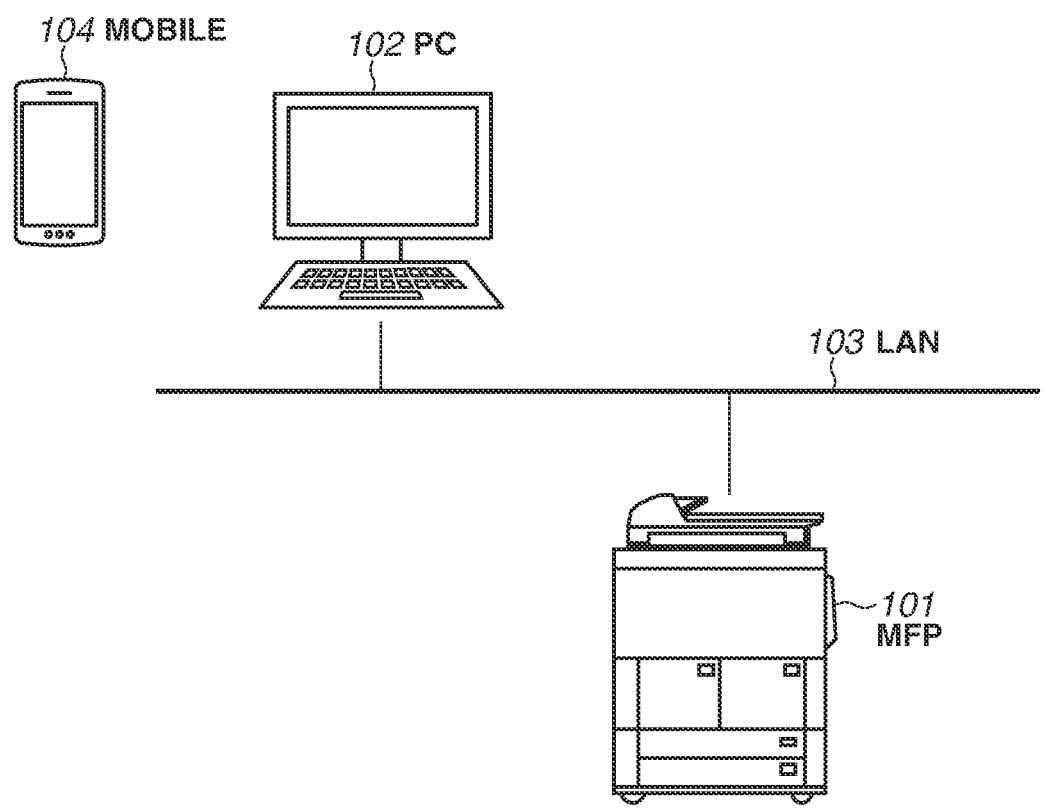
FIG. 1 illustrates a network configuration.

A network configuration in an office environment according to the present exemplary embodiment will be described with reference to FIG. 1.

An MFP 101 is an MFP to which the present exemplary embodiment of the present disclosure is applied and is an apparatus having a plurality of functions such as a local user interface (UI) function, a remote UI function, and a user authentication function in addition to the plurality of image processing functions described above. The MFP 101 communicates with a personal computer (PC) terminal (for example, a PC 102) connected via a network local area network (LAN) 103. A user can use the remote UI of the MFP 101 by accessing the MFP 101 from a web browser of the PC terminal. The MFP 101 can also receive a print job or a request for access to a document stored in the MFP 101 from a terminal (for example, the PC 102). That is, the MFP 101 can receive remote access from the terminal.

An individual user has at least one mobile terminal 104. In the present exemplary embodiment, the mobile terminal 104 does not need to be connected to the network LAN 103. A mobile application supporting a time-based one-time password (TOTP), which will be described below, is installed in the mobile terminal 104, and the mobile terminal 104 can generate a one-time password. The one-time password is used as a single authentication information item in multi-factor authentication processing performed by the MFP 101 when the mobile terminal 104 remotely accesses a remote UI 302 of the MFP 101. The following description assumes that a plurality of other MFPs having the same configuration, a plurality of other PC terminals having the same configuration, and a plurality of other mobile terminals having the same configuration are present in the office environment while these elements are not illustrated in FIG. 1. Each of these MFPs, PC terminals, and mobile terminals can coordinate with the mechanism to be described below in the same manner.

<Hardware Configuration>

Figure 2:
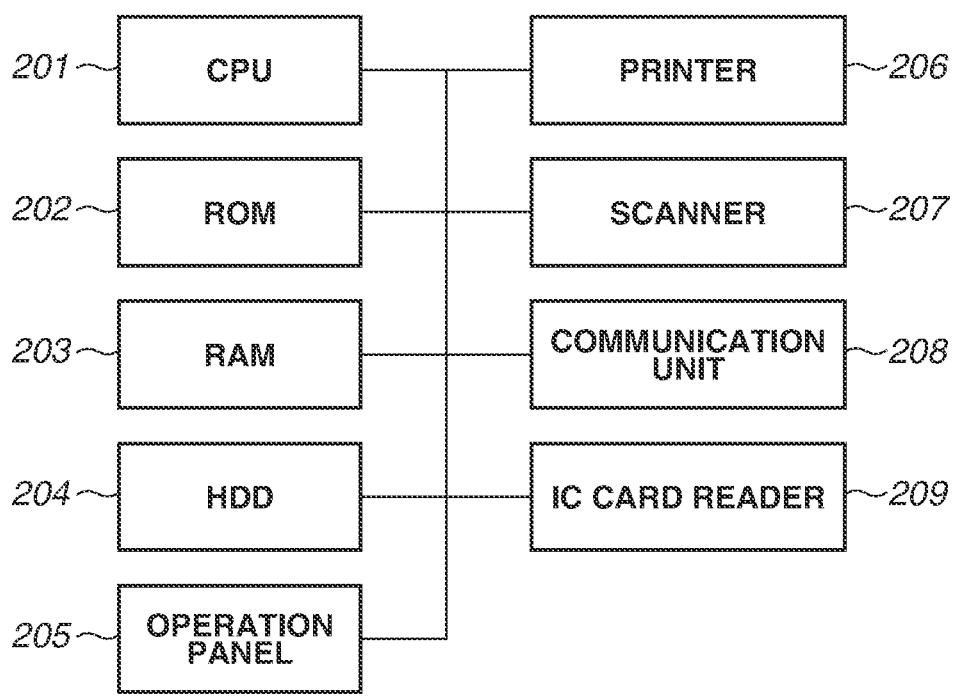
FIG. 2 illustrates a hardware configuration of a multi-function peripheral (MFP).

FIG. 2 schematically illustrates a hardware configuration of the MFP 101. A central processing unit (CPU) 201 is a processor that controls the operation of the entire MFP 101. A random access memory (RAM) 203 is a volatile memory and serves as a work area. The RAM 203 is used as a temporary storage area for expanding various control programs stored in a read-only memory (ROM) 202 and a hard disk drive (HDD) 204.

The ROM 202 is a non-volatile memory and holds, for example, a boot program of the MFP 101. The HDD 204 is a non-volatile hard disk having a larger capacity than that of the RAM 203. A control program of the MFP 101 is stored in the HDD 204. An operating system (OS) and application programs are also stored in the HDD 204.

The CPU 201 executes the boot program stored in the ROM 202 when starting the MFP 101. This boot program is for reading the OS program stored in the HDD 204 and expanding the read OS program on the RAM 203. When the CPU 201 executes the boot program, the CPU 201 then executes the OS program expanded on the RAM 203 to control the MFP 101. In addition, the CPU 201 stores data to be used for the operation performed by the control program in the RAM 203 and performs reading and writing of the data.

In the MFP 101, this single CPU 201 that executes programs performs processing according to the individual flowcharts described below. However, another mode can alternatively be employed. For example, a plurality of CPUs or microprocessors (MPUs) can cooperate with each other to execute each processing illustrated in the flowcharts described below. Further, a part of the processing described below can be performed using a hardware circuit such as an application specific integrated circuit (ASIC) or a field programmable gate array (FPGA).

An operation panel 205 is a display on which a touch operation can be performed. A printer 206 is a printer engine that prints print data received from the outside via a communication unit 208 and digital data acquired from a scanner 207. A print function, which is one of the image processing functions, provides services that use the printer engine.

The scanner 207 is a scanner device that reads a paper document and converts the read data into digital data. A scan function, which is one of image processing functions, provides services that use the scanner device. The communication unit 208 is a network interface for connecting to the Internet or an office local area network (LAN). An integrated circuit (IC) card reader 209 is a device for reading information to be used for user authentication from an IC card and is a unit necessary for realizing IC card authentication. While the MFP 101 including a plurality of image processing engines will be described in the present exemplary embodiment, a single-function printer that includes a printer engine without a scanner and that mainly provides a print function as an image processing function is also applicable, for example.

<Software Configuration>

Figure 3:
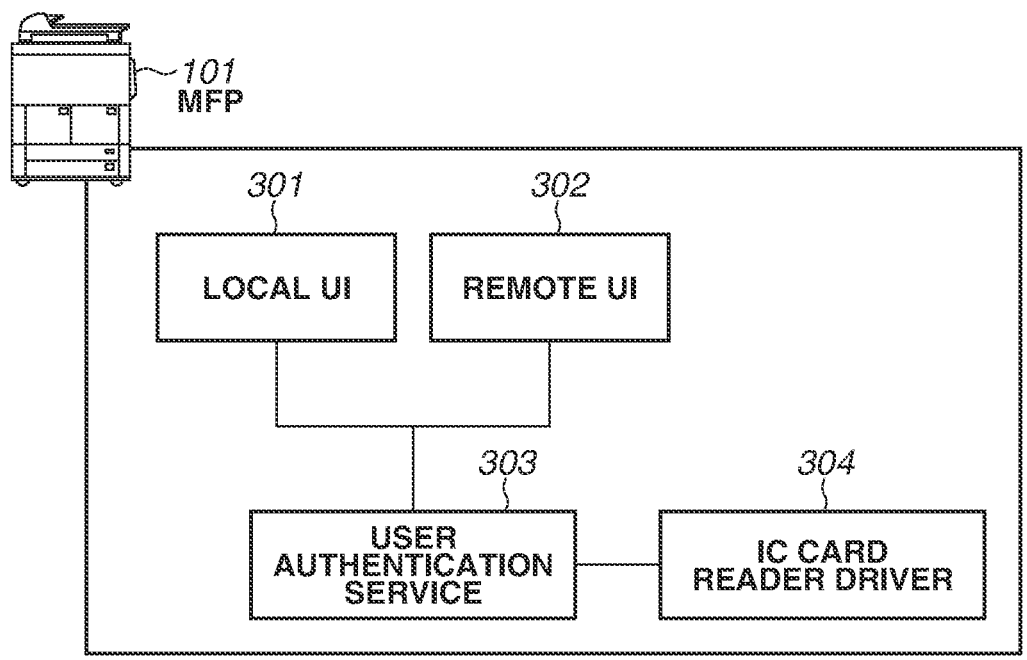
FIG. 3 illustrates a software configuration.

FIG. 3 schematically illustrates a software configuration of the MFP 101. Each element is a software function realized by a program. A local UI 301 of the MFP 101 is a local UI function and provides a user who locally accesses the MFP 101 using the display of the operation panel 205 with a user interface so that the user can change settings of the MFP 101 and can use functions of the MFP 101. The remote UI 302 is a remote UI function having a Hypertext Transfer Protocol (HTTP) server function. The remote UI 302 provides a user who remotely accesses the HTTP server function with a user interface configured in Hypertext Markup Language (HTML).

A user can access the remote UI 302 using a web browser of the PC terminal to change settings of the MFP 101 and use image processing functions such as a print function and a scan function. The web browser of the PC terminal displays a user interface configured in HTML. The user operates the user interface displayed on the web browser to change settings or use functions.

A user authentication service 303 is a software module that authenticates a user using the local UI 301 or the remote UI 302. The user authentication service 303 authenticates a user who uses the local UI 301 by an IC card and a password. Further, the user authentication service 303 authenticates a user who uses the remote UI 302 by a user name, a password, and a one-time password. While the multi-factor authentication processing is supported as described above, for example, the local UI 301 can also support authentication processing based on an IC card alone through a user setting. An IC card reader driver 304 is a driver that controls the IC card reader 209, acquires information from an IC card, and provides information about the IC card to the user authentication service 303. While not illustrated in FIG. 3, the MFP 101 is provided with a plurality of image processing functions including a print function. For example, the image processing functions are a print service, which is a print processing function, and a storage service, which is a storage processing function for storing image data obtained by scanning a document and image data transmitted from an external apparatus.

These software functions are realized by causing the CPU 201 to load their respective programs stored in the HDD 204 to the RAM 203 and to execute the programs. The subsequent operations are performed by at least one of these software functions.

<One-Time Password>

A one-time password used in the present exemplary embodiment will be described. TOTP defined in a Request for Comments (RFC) 6238 can be used as a method for generating a one-time password. In this method, a one-time password serving as authentication information is generated using a TOTP secret generated per user and time information. The TOTP secret is a random number. In recent years, mobile applications (applications for smartphones) supporting TOTP have become widespread.

For example, there are Google Authenticator® of Google Inc. and Microsoft Authenticator® of Microsoft Corporation. A TOTP secret is stored in a mobile application supporting TOTP by registering the TOTP secret as a character string in the mobile application or by causing the mobile application to capture an image of a Quick Response (QR) Code® including TOTP secret information. This allows sharing of the TOTP secret between a TOTP secret generator and the mobile application. The mobile application supporting TOTP generates a one-time password based on the TOTP secret and the time.

In addition to the above mobile application supporting TOTP, there is a plug-in supporting TOTP that can be installed as an extended function of a PC web browser. In this exemplary embodiment, the TOTP secret generator is the user authentication service 303. The present exemplary embodiment assumes that each user who uses the MFP 101 uses a mobile application supporting TOTP or a web browser plug-in supporting TOTP. In general, a one-time password generated using software, such as a mobile application or a web browser plug-in, is referred to as a software token. An authentication method using a software token is referred to as software token authentication.

The present exemplary embodiment assumes that the user authentication service 303 receives a request from the local UI 301 or the remote UI 302 that has detected a user operation, generates a TOTP secret, generates a one-time password, and checks a one-time password. In addition, in the preset exemplary embodiment, a state in which a TOTP secret associated with an account is recorded in a user information table (to be described below) will be defined as a one-time password enabled state, and a state in which a TOTP secret is not recorded will be defined as a one-time password disabled state.

<User Information>

User information managed by the user authentication service 303 will be described. The user authentication service 303 holds and manages user information in a user information table as illustrated in Table 1. The user information table is a database recorded in the HDD 204. A database of another node on a network can alternatively be used after encrypting communication paths and storages and taking countermeasures against falsification. The user information table holds a user name used as a user ID, a card ID used for IC card authentication, a personal identification number, a password, a TOTP secret, an application password, a user role, a mail address, and the like. The user name and the user ID can be set separately.

TABLE 1

| User Name | Card ID | Personal Identification Number | Password | TOTP Secret | Application Password Storage Service | Application Password Print Service | Role | Mail |
|---|---|---|---|---|---|---|---|---|
| Admin | F1EABB15 ... | 479960 | **** **** | 6fc11e17-faf4 ... | — | | Administrator | admin@canon.com |
| Alice | 44E7158E ... | 22524 | **** **** | 96df7500-7e82 ... | 01234567 | | Administrator | allice@canon.com |
| Bob | 045BB438 ... | 033886 | **** **** | | — | 12345678 | GeneralUser | bob@canon.com |
| Carol | 19E313B6 ... | 838214 | **** **** | 1fb233f6-1f8e ... | 23456789 | | GeneralUser | carol@canon.com |
| Dave | BDFDB35 ... | 375384 | **** **** | | 34567890 | 45678901 | LimitedUser | dave@canon.com |

The role is information indicating use authority of the corresponding user about the MFP 101. The following role information table (Table 2) illustrates examples of the roles and use authorities. In addition to the definitions of the roles set in the MFP 101 at the time of factory shipment, the user can be allowed to create new roles by setting detailed use authorities. Changing a setting in Table 2 signifies changing a value set in the MFP 101 such as about a user authentication setting or user management to be described below. Various settings, such as the network settings and the print function settings of the MFP 101, can be changed. "Administrator" is a role given to administrator users, and "GeneralUser" and/or "LimitedUser" are roles given to general users.

TABLE 2

| Role | Authority |
|---|---|
| Administrator | Setting Change Allowed, Color Printing Allowed, Address Book Editing Allowed |
| GeneralUser | Setting Change Not Allowed, Color Printing Allowed, Address Book Browsing Allowed |
| LimitedUser | Setting Change Not Allowed, Color Printing Prohibited, Address Book Browsing Prohibited |

<User Authentication Settings>

Figure 4:
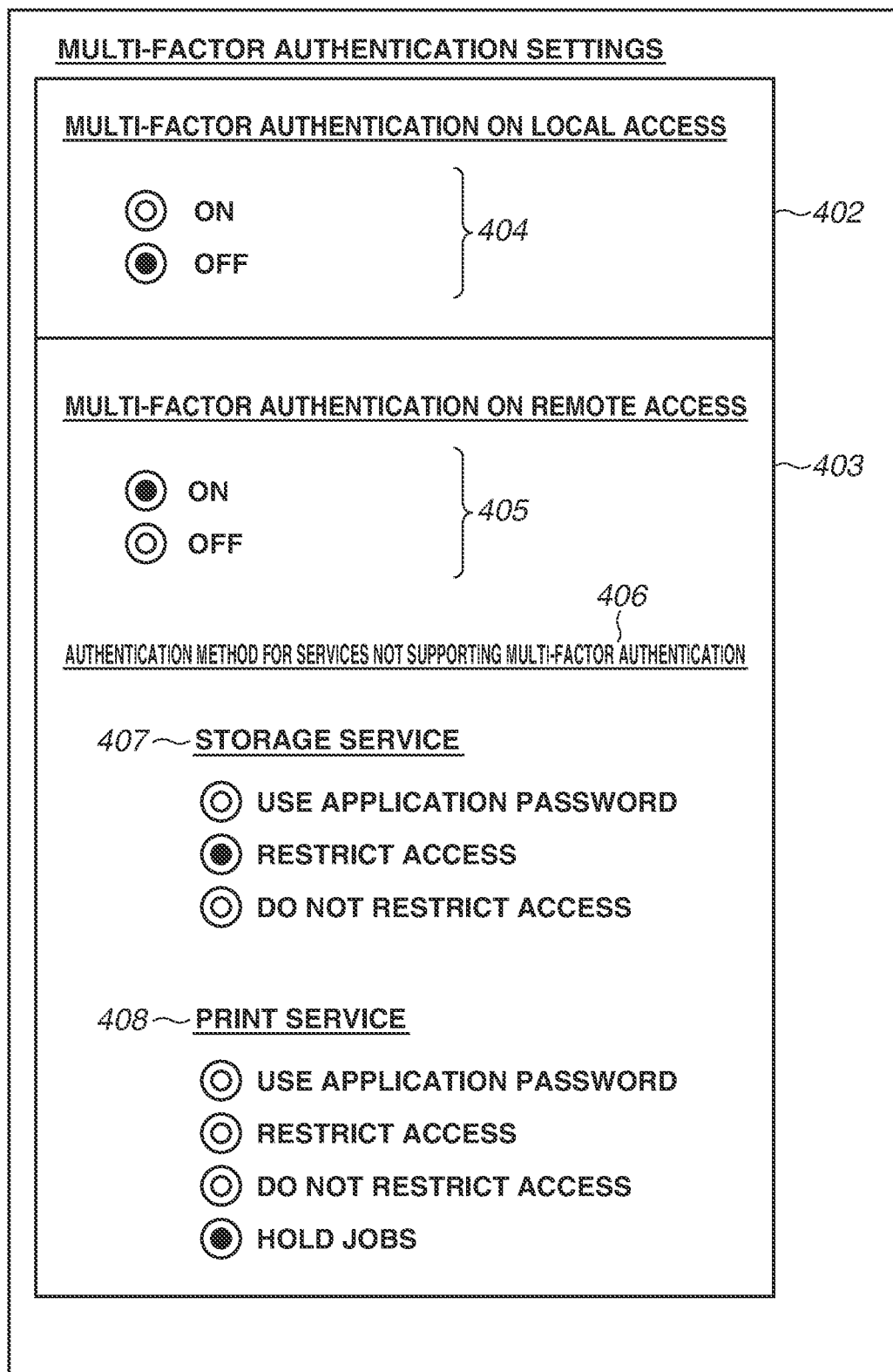
FIG. 4 illustrates a user interface for multi-factor authentication settings.

The user authentication settings of the MFP 101 will be described. FIG. 4 illustrates an example of a UI for the user authentication settings of the MFP 101. This UI is provided by the remote UI 302. Besides the remote UI 032, the local UI 301 can also be configured to provide the administrators with the same UI.

The remote UI 302 displays a screen 401 on which the user authentication settings are made. Only the administrators with an administrator role can access the screen 401. The screen 401 includes an area 402 for a multi-factor authentication setting on local access and an area 403 for the multi-factor authentication setting on remote access. In an area 404, an administrator can enable (ON) or disable (OFF) the multi-factor authentication setting on local access. By switching the setting to ON, the multi-factor authentication processing is performed on local access. For example, the administrator enables multi-factor authentication in which an IC card as "possession information" and a personal identification number as "knowledge information" are combined. Authentication using a one-time password generated from a hardware token or a software token as "possession information" can be applied. In the present exemplary embodiment, the multi-factor authentication setting is provided for each of the local UI and the remote UI. However, a single multi-factor authentication setting can be provided as a common setting applied to both the local UI and the remote UI.

In an area 405, the administrator can enable or disable the multi-factor authentication setting on remote access. While there are several protocols on remote access, not all kinds of image processing support the multi-factor authentication. Thus, a service supporting the multi-factor authentication and a service not supporting the multi-factor authentication operate differently. In the present exemplary embodiment, in a case where an administrator switches the setting to ON in the area 405, the MFP 101 performs the multi-factor authentication processing on remote access to the remote UI 302. If there is another specific Web service or an image processing function supporting the multi-factor authentication, the MFP 101 can request authentication based on the multi-factor authentication, in a case where the setting is switched to ON.

An area 406 provides a function of individually setting an authentication method for a service not supporting the multi-factor authentication. In the present exemplary embodiment, a setting example is illustrated per service, such as a storage service as a storage processing function and a print service as a print processing function. However, the setting can be made per specific protocol, such as server message block (SMB) and Internet printing protocol (IPP). While not illustrated in the present exemplary embodiment, the MFP 101 can be configured such that communications based on management-related services such as Simple Network Management Protocol version 3 (SNMPv3) and other network protocols are supported. In a case where the setting is switched to OFF in the area 405 to disable the multi-factor authentication processing on remote access, image processing functions not supporting the multi-factor authentication perform their respective default remote access control processing. For example, when the print processing function using IPP sets IPP authentication printing as its default setting, user authentication processing using authentication information such as a password is performed at the time of an IPP print request without performing the multi-factor authentication processing. The present exemplary embodiment assumes that a default setting is a value set on the setting screen of an individual image processing function, and this value can be changed by the user.

In an area 407, the administrator makes a storage service authentication setting. The term "storage service" refers to a general function of accessing data such as documents in the MFP 101 using a protocol such as SMB or Web-based Distributed Authoring and Versioning (WebDAV). The storage service provides the user with the following options: "Use Application Password", "Restrict Access", and "Do Not Restrict Access".

In a case where "Use Application Password" is set, the user authentication service 303 generates a password unique to the storage service and stores the generated application password in the user information table (Table 1) on the HDD 204. In a case where "Use Application Password" is set, the application password is used at the time of user authentication, instead of the password used in normal user authentication processing.

While a one-time password is generated every time communication is performed, once an application password is generated, the application password is repeatedly used unless the application password is deleted and generated again. Further, the application password is not unique to an apparatus but is generated per user. In addition, a different password is generated per service. In this way, even if the password is stolen, only the service in question could be misused. The password representation method is not particularly limited, and authentication information unique to an individual image processing function to be accessed is collectively referred to as application authentication information.

In a case where "Restrict Access" is selected, the user authentication service 303 rejects remote access upon receiving an authentication request for use of the storage service. Processing for rejecting remote access has been described as an example of access restriction. However, the user authentication service 303 can perform matching between a user name and a password in the user information table (Table 1) to permit the communication in a case where the authentication succeeds. In this case, the image processing function based on the role of the user can be used.

In a case where "Do Not Restrict Access" is selected, the authentication processing is not performed, that is, any kind of remote access is accepted. In this way, while the security of the target image processing function is low, the convenience is improved. That is, the convenience can be improved through a user setting. In consideration of security, access restriction can be made such that only a part of the image processing functions to be accessed is prohibited and the other functions are limitedly used. For example, functional restriction can be made such that monochrome printing is permitted but color printing is prohibited. While the two options of "Restrict Access" and "Do Not Restrict Access" are used in the present exemplary embodiment, many specific options such as "Reject Remote Access" can be prepared, for example.

In an area 408, an administrator makes a print service authentication setting. The "Print Service" refers to a general function of transmitting a print job to the MFP 101 using a protocol such as IPP.

The print service provides the user with the following options: "Use Application Password", "Restrict Access", "Do Not Restrict Access", and "Hold Jobs".

Processing performed in a case where "Use Application Password", "Restrict Access", or "Do Not Restrict Access" is selected is equivalent to the corresponding processing described for the storage service in the area 407. In a case where an administrator selects "Hold Jobs", when the MFP 101 receives a print job, the MFP 101 stores the print job in a storage medium such as the HDD 204, without printing the print job. This is referred to as holding of a print job. When the user logs into the MFP 101 by locally accessing the local UI 301, selects a print job from the print jobs displayed on a list screen (not illustrated), and gives a print instruction, print processing is performed on the held job. This is referred to as hold printing. When execution of the multi-factor authentication on local access is enabled, only a user authenticated by the multi-factor authentication can use the function of hold printing. Thus, it is possible to use the function while maintaining a secure environment.

The areas 407 and 408 are for the settings made when the multi-factor authentication processing is performed on remote access. Thus, when the multi-factor authentication processing is not performed on remote access, the display of the areas 407 and 408 can be controlled so that the multi-factor authentication processing cannot be set.

<Management of User Information>

FIG. 5 is an example of a UI that is provided by the remote UI 302 and is for managing the user accounts of the MFP 101. The local UI 301 can also be configured to provide the same UI to the administrators.

A list of user accounts is managed on a user information management screen 501. Only the administrators with the administrator role can access the user information management screen 501. The user information management screen 501 provides a function of registering new user accounts and selecting, editing, and deleting registered accounts. For example, when "Admin" selects the account of "Alice" on the user information management screen 501 and presses an edit button, the remote UI 302 displays a user information edit screen 502. On the user information edit screen 502, a password, a personal identification number, a card ID, a role, a mail address, etc. can be edited and stored.

The user information edit screen 502 displays a state (enabled/disabled) of the one-time password used for the user authentication of the remote UI. The administrator can initialize (disable) the one-time password by pressing a disable button 503 on the user information edit screen 502. Further, the administrator can check a generation status of the application password of an individual service. In a case where an application password has already been generated, the application password can be deleted by pressing a delete button 504.

<Editing of My-Profile>

Figure 6:
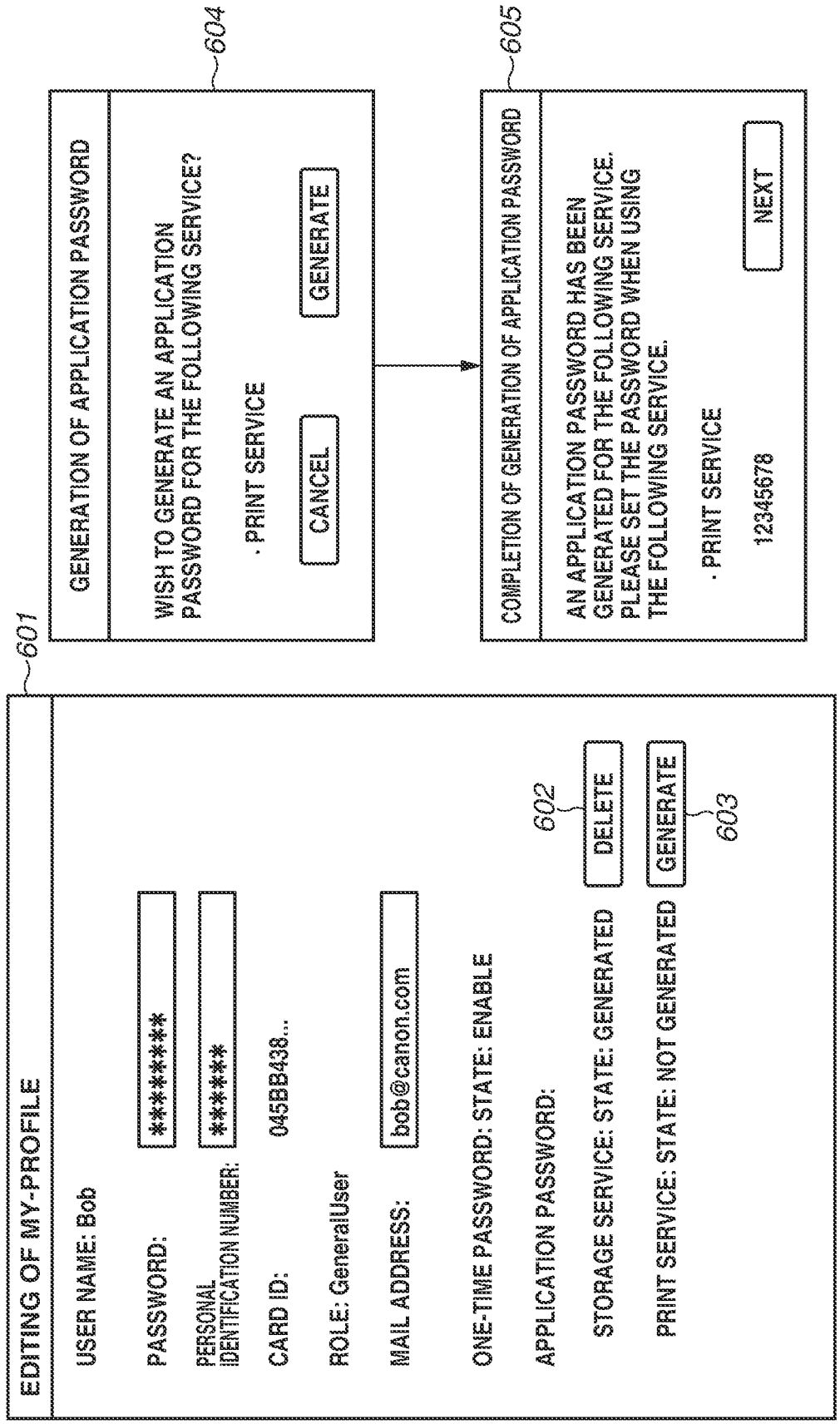
FIG. 6 illustrates a user interface for editing a my-profile.

FIG. 6 is an example of a UI that is provided by the remote UI 302 and that is for editing a my-profile.

A my-profile edit screen 601 is a UI for a user who has logged in the remote UI 302 to check and edit information about his/her own account. Such my-profile edit screen 601 is provided to all users who can log in the remote UI 302. The local UI 301 can also be configured to provide the same UI. On the my-profile edit screen 601, a password, a personal identification number, and a mail address can be edited and stored. The user cannot change his/her own role. On the my-profile edit screen 601, the user can check the state of the one-time password used for user authentication of the remote UI.

Further, the user can check the generation status of his or her application password. In a case where an application password has already been generated, the application password can be deleted by pressing a delete button 602. In a case where an application password has not been generated yet, an application password generation screen 604 is displayed by pressing a generate button 603. In this way, an application password can be generated per service. By pressing a "generate" button on the application password generation screen 604, an application password generation completion screen 605 is displayed, and the generated application password is displayed on the screen.

<Login Operation>

An operation performed when a user logs in the MFP 101 will be described with reference to a flowchart. A software program is stored in a non-volatile storage such as the ROM 202 or the HDD 204. The software program is loaded into the RAM 203, and the CPU 201 performs the processing illustrated in the flowchart. In addition, software programs such as the local UI 301, the remote UI 302, the user authentication service 303, and the IC card reader driver 304 mutually provide application programming interfaces (APIs) and mutually use the APIs to operate in coordination with each other. In the description of the following processing, the description of calling of the APIs will be omitted.

<Login Processing of Remote UI>

Figure 7:
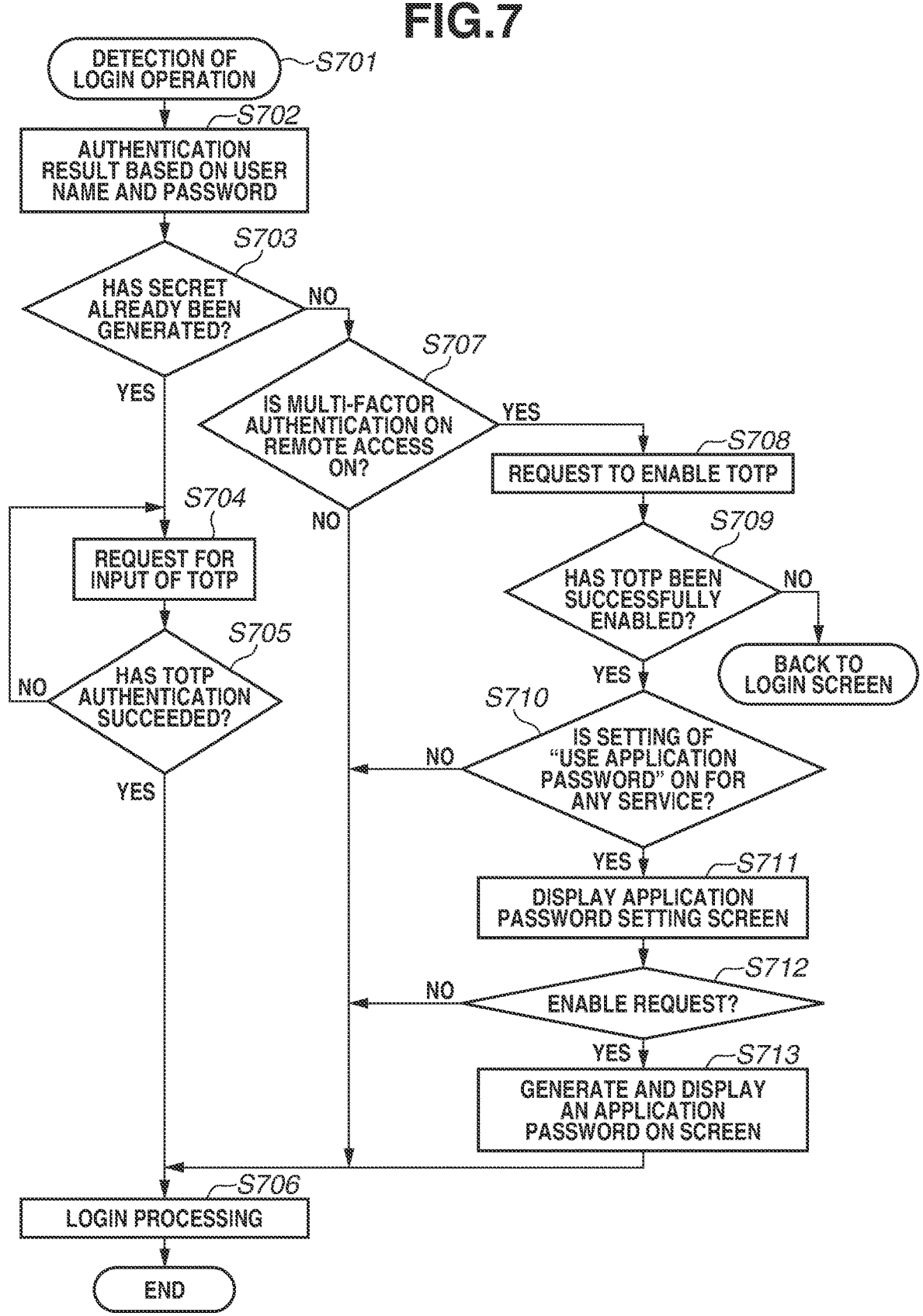
FIG. 7 is a flowchart illustrating an operation of user authentication performed by a remote user interface (UI).
Figure 8:
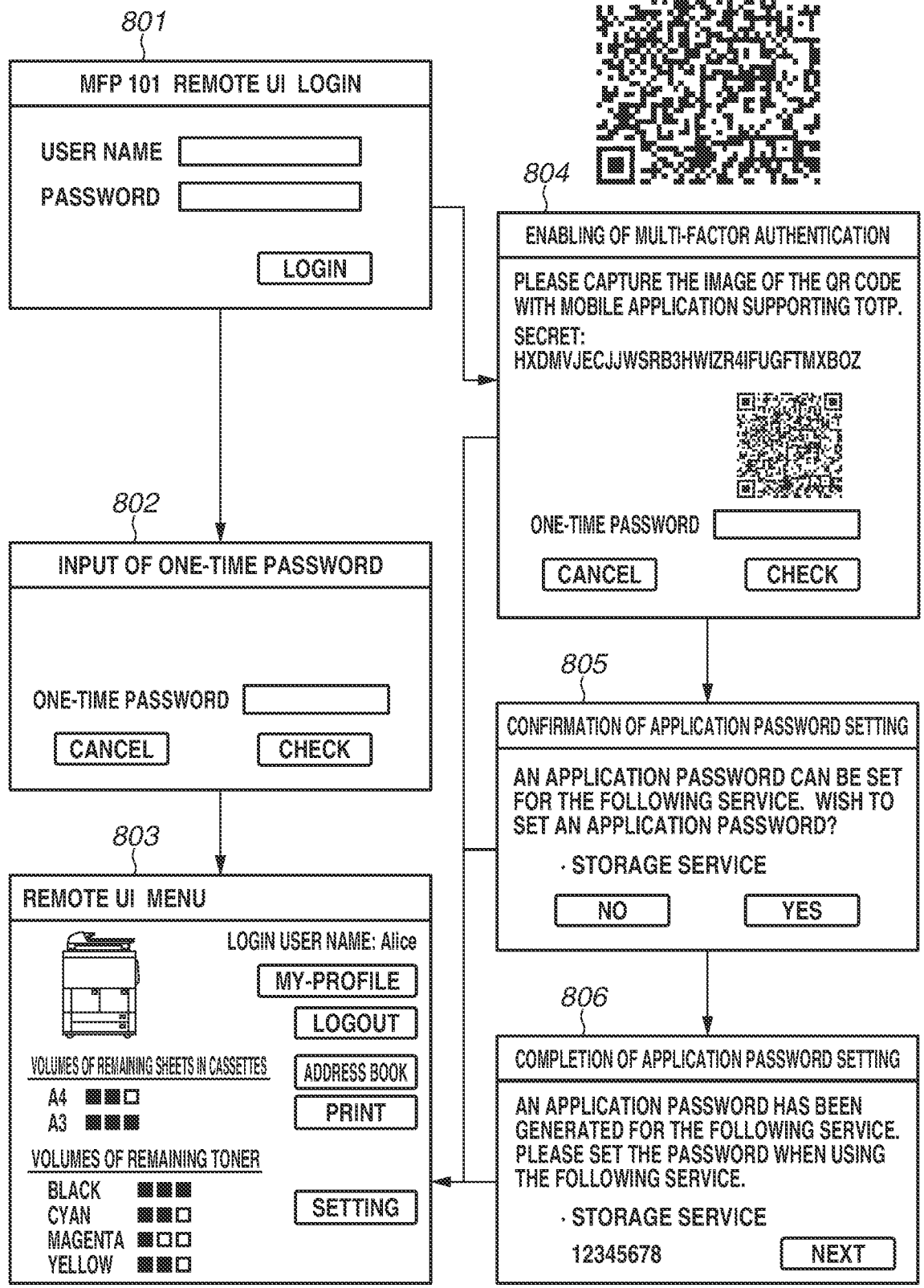
FIG. 8 illustrates a screen provided by the remote UI to a web browser of a personal computer (PC) and transition of the screen.

An operation of the remote UI 302 performed when a user logs in the MFP 101 will be described with reference to FIGS. 7 and 8. FIG. 7 is a flowchart illustrating an operation when the remote UI 302 performs user authentication. FIG. 8 is a screen created in HTML that the remote UI 302 provides to the web browser of a PC and transition of the screen.

Upon detecting access to the remote UI 302, the remote UI 302 displays a login screen 801 of the remote UI. In step S701, a user inputs a user name and a password and presses a login button, and the remote UI 302 detects a login operation. In step S702, the user authentication service 303 performs the authentication processing on the user by referring to the user information table (Table 1) and determining whether the input user name and password match. In a case where the user name and the password do not match, the remote UI 302 displays an authentication error and displays the login screen 801 to request the user accessing the remote UI 302 to input a user name and a password again. In a case where the user name and the password match, the user authentication service 303 identifies the authenticated account of the user.

In step S703, the remote UI 302 refers to the TOTP secret of the identified account in the user information table (Table 1) and determines whether the TOTP secret has been registered. In a case where the TOTP secret has been registered (YES in step S703), the processing proceeds to step S704. In step S704, the remote UI 302 determines that a one-time password is enabled and displays a one-time password input screen 802 to request the user to input the one-time password. Next, in step S705, the remote UI 302 determines whether the input one-time password matches a one-time password calculated by the user authentication service 303 from the time information and the TOTP secret. In a case where the input one-time password is correct (YES in step S705), the remote UI 302 authenticates the one-time password, and the processing proceeds to step S706. In step S706, the remote UI 302 allows the user to log in the MFP 101.

In a case where the authentication of the one-time password fails (NO in step S705), the remote UI 302 presents to the user a message that the one-time password does not match and displays the one-time password input screen 802 again, to request the user to input a one-time password again. If failure of the authentication continues more than a certain number of times, the remote UI 302 determines that the MFP 101 is being attacked and executes lockout of the account for a certain period of time.

In step S706, the remote UI 302 refers to the user information table (Table 1) and the role information table (Table 2), gives the role of the login user and the authority associated with the role, and performs control processing for allowing the user to log in the MFP 101. The remote UI 302 displays a menu screen 803 for allowing the user to use the function of the MFP 101 provided by the remote UI 302 and ends the login processing. On the displayed menu screen 803, a function(s) that the user is not allowed to use is grayed out so that the user cannot select the function(s).

In step S703, in a case where the remote UI 302 determines that the TOTP secret is not registered and the one-time password is not enabled (NO in step S703), the processing proceeds to step S707. In step S707, the remote UI 302 determines whether the setting of the multi-factor authentication on remote access is ON or OFF in the area 405. In a case where the multi-factor authentication on remote access is OFF (NO in step S707), the processing proceeds to step S706. In step S706, the remote UI 302 performs processing for allowing the user to log in the MFP 101 without requesting for input of a one-time password. In a case where the multi-factor authentication on remote access is ON (YES in step S707), the processing proceeds to step S708. In step S708, the remote UI 302 generates a QR code including a TOTP secret via the user authentication service 303 and displays a one-time password enabling screen 804. Then, the processing proceeds to step S709.

In step S709, the remote UI 302 determines whether the TOTP has been successfully enabled. In a case where the remote UI 302 determines that the one-time password has been successfully enabled (YES in step S709), the processing proceeds to step S710. In step S710, the remote UI 302 checks the setting values of services (the storage service 407 and the print service 408) that do not support the multi-factor authentication. In addition, the remote UI 302 determines whether the setting of "Use Application Password" is ON for any service. In a case where the TOTP has not been successfully enabled (NO in step S709), the remote UI 302 displays the login screen 801 again.

In step S710, in a case where none of the services uses an application password (NO in step S710), the processing proceeds to step S706. In step S706, the remote UI 302 performs processing for allowing the user to log in the MFP 101. In a case where "Use Application Password" is ON for a service (YES in step S710), the processing proceeds to step S711. In step S711, the remote UI 302 displays an application password setting confirmation screen 805. Then, in step S712, the remote UI 302 asks the user whether the user sets an application password.

In a case where the remote UI 302 receives an enabling request (YES in step S712), the processing proceeds to step S713. In step S713, the remote UI 302 generates an application password and displays an application password setting completion screen 806. Further, in a case where "Next" is selected on this screen 806, the processing proceeds to step S706. In step S706, the remote UI 302 performs processing for allowing the user to log in the MFP 101. In a case where there is no request for enabling the application password in step S712 (NO in step S712), the processing also proceeds to step S706. In step S706, the remote UI 302 performs processing for allowing the user to log in the MFP 101.

While not illustrated herein, in a case where a plurality of services are set to use application passwords, a plurality of application passwords can be displayed on the application password setting confirmation screen 805. In this case, the plurality of application passwords can be generated at the same time when a validation request is made. Alternatively, a switch can be provided per service, and an application password can be set per service.

<Multi-Factor Authentication of Print Service>

Figure 9:
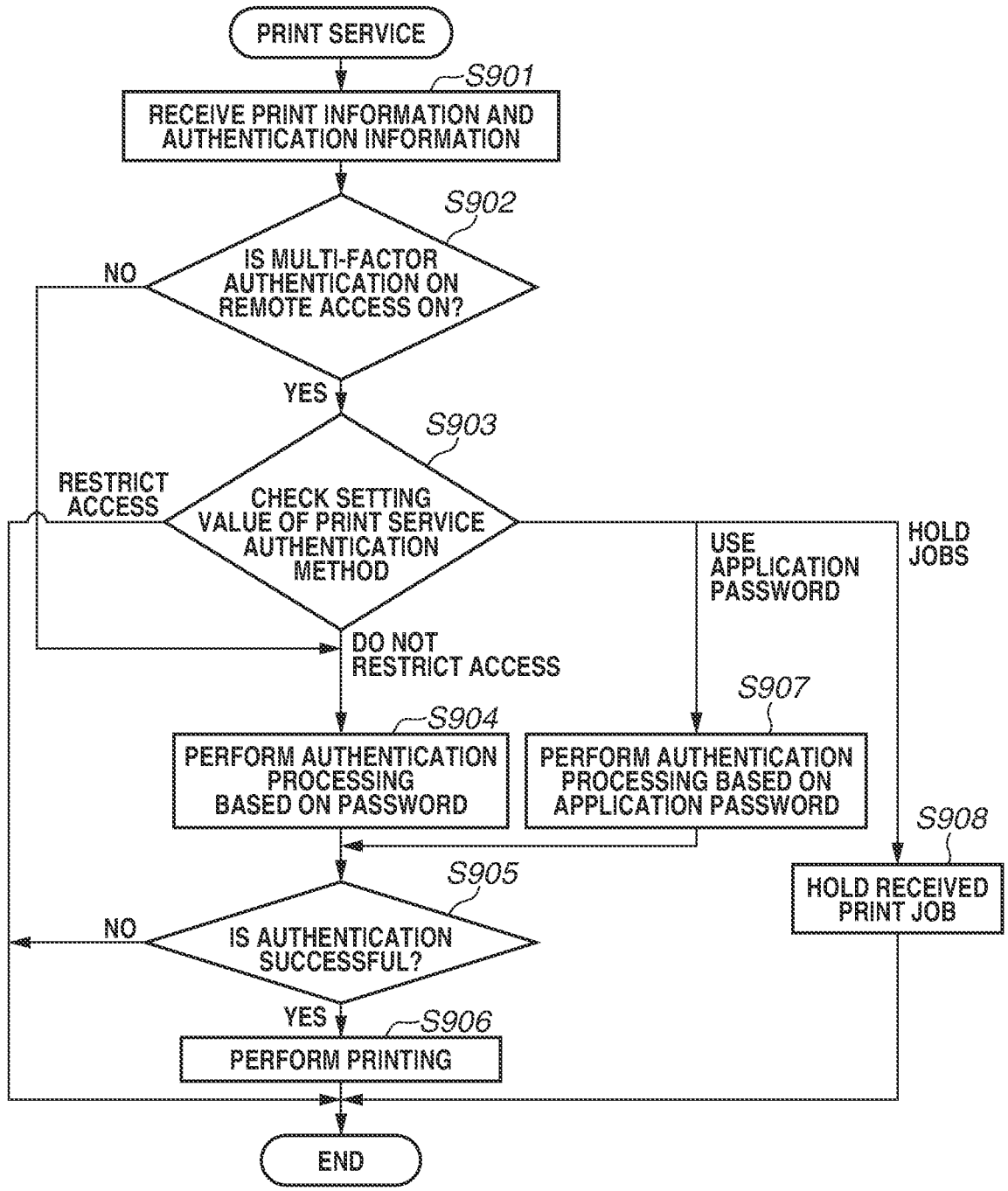
FIG. 9 is a flowchart illustrating an operation of a print service performed when a print job is received.

The configuration of the present exemplary embodiment will be described using, as an example, a print function, which is one of image processing functions. An operation of the print service when a print job is transmitted from the PC 102 using a print protocol such as the IPP protocol will be described with reference to a flowchart in FIG. 9. The print service, which is a print processing function, mainly performs the following operation.

First, in step S901, the print service receives print information and authentication information transmitted by the PC 102. Next, in step S902, the print service checks whether the setting value of the multi-factor authentication on remote access is ON in the area 405. In a case where the setting value is ON (YES in step S902), the processing proceeds to step S903. In step S903, the print service checks the setting value of the print service authentication method in the area 408. In a case where the setting value is OFF (NO in step S902), the processing proceeds to step S904. The present exemplary embodiment assumes that the default access control of the print service is normal authentication printing. However, if no authentication is necessary, the processing proceeds to step S906, instead of step S904. In a case where the setting value in the area 408 indicates "Restrict access" in step S903, since all users are prohibited to access the print service, the print service records an error and ends the present processing, instead of performing printing.

In a case where the setting value indicates "Do not restrict access" in the area 408 in step S903, the processing proceeds to step S904. In step S904, the print service does not perform authentication based on the multi-factor authentication. That is, in step S904, the user authentication service 303 performs the authentication processing on the user by referring to the user information table (Table 1) and checking the input user name and password. In step S905, the user authentication service 303 checks the authentication result. In a case where the authentication succeeds (YES in step S905), the processing proceeds to step S906, and the print service performs print processing. In a case where the authentication fails (NO in step S905), the print service records an error and ends the present processing without performing printing.

In a case where the setting value indicates "Use application password" in the area 408 in step S903, the processing proceeds to step S907. In step S907, the user authentication service 303 performs the authentication processing on the user by referring to the user information table (Table 1) and checking the input user name and application password. In a case where the setting value indicates "Hold jobs" in the area 408 in step S903, the processing proceeds to step S908. In step S908, the print service holds the received print job, instead of performing printing.

The held job is stored in a held job list. In this operation, the user name and the job ID of the received print job are associated with each other as illustrated in Table 3. The held job list is a database recorded in the HDD 204. Job information associated with the job ID, e.g., information such as a job name and a reception date and time, is also recorded.

TABLE 3

| User Name | Job ID | Job Name | Date and Time |
|---|---|---|---|
| Alice | 10001011 | Document A | 2020 Jan. 12 13:00 |
| Alice | 10001012 | Document B | 2020 Jan. 12 13:01 |
| Bob | 10001013 | Document C | 2020 Jan. 12 13:05 |
| Bob | 10001014 | Document D | 2020 Jan. 12 13:06 |
| Carol | 10001015 | Document E | 2020 Jan. 12 13:10 |
| Dave | 10001016 | Document F | 2020 Jan. 12 13:20 |
| Dave | 10001017 | Document G | 2020 Jan. 12 13:21 |

Figure 10:
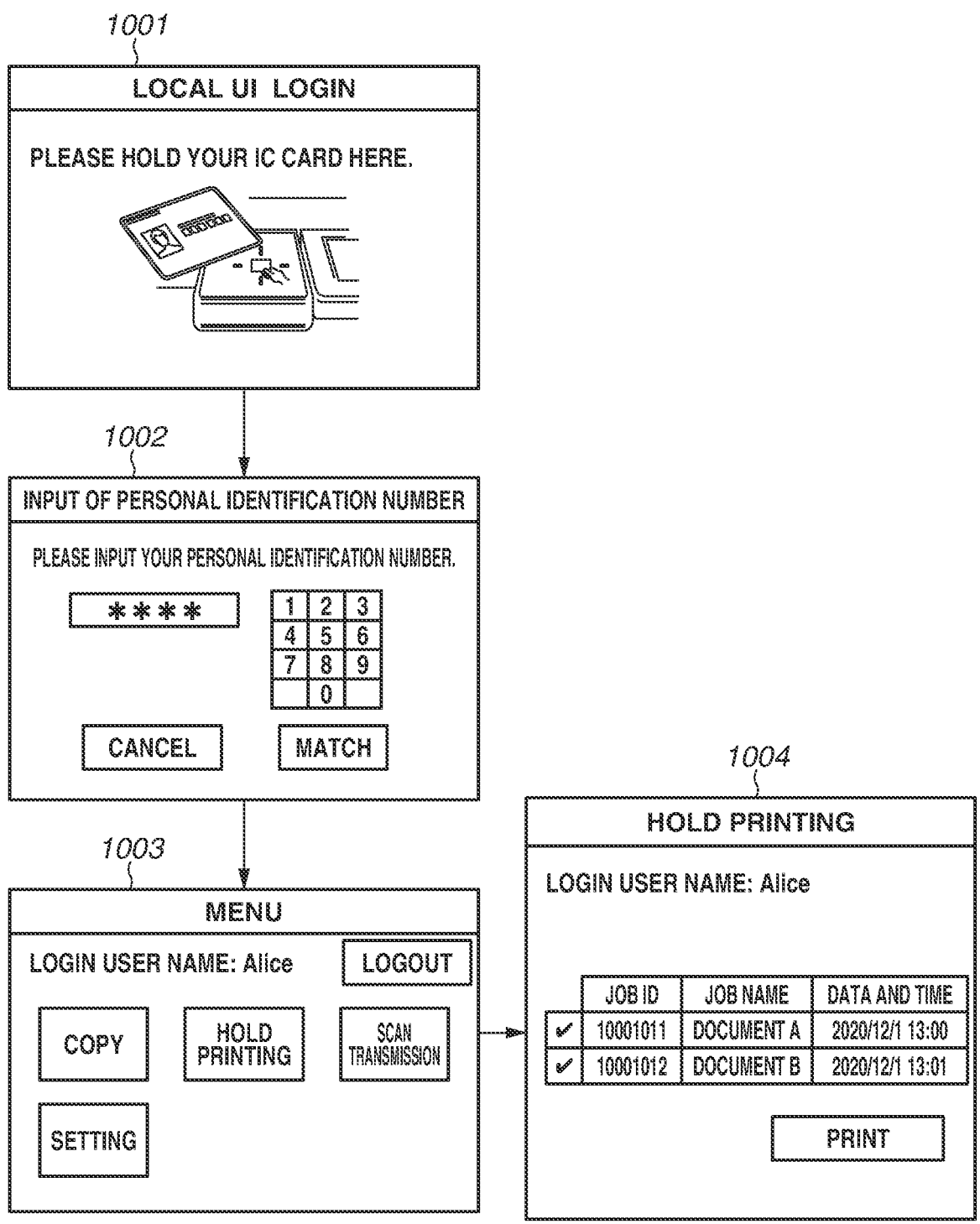
FIG. 10 illustrates a screen displayed on an operation panel of the MFP by a local UI and transition of the screen.
Figure 11:
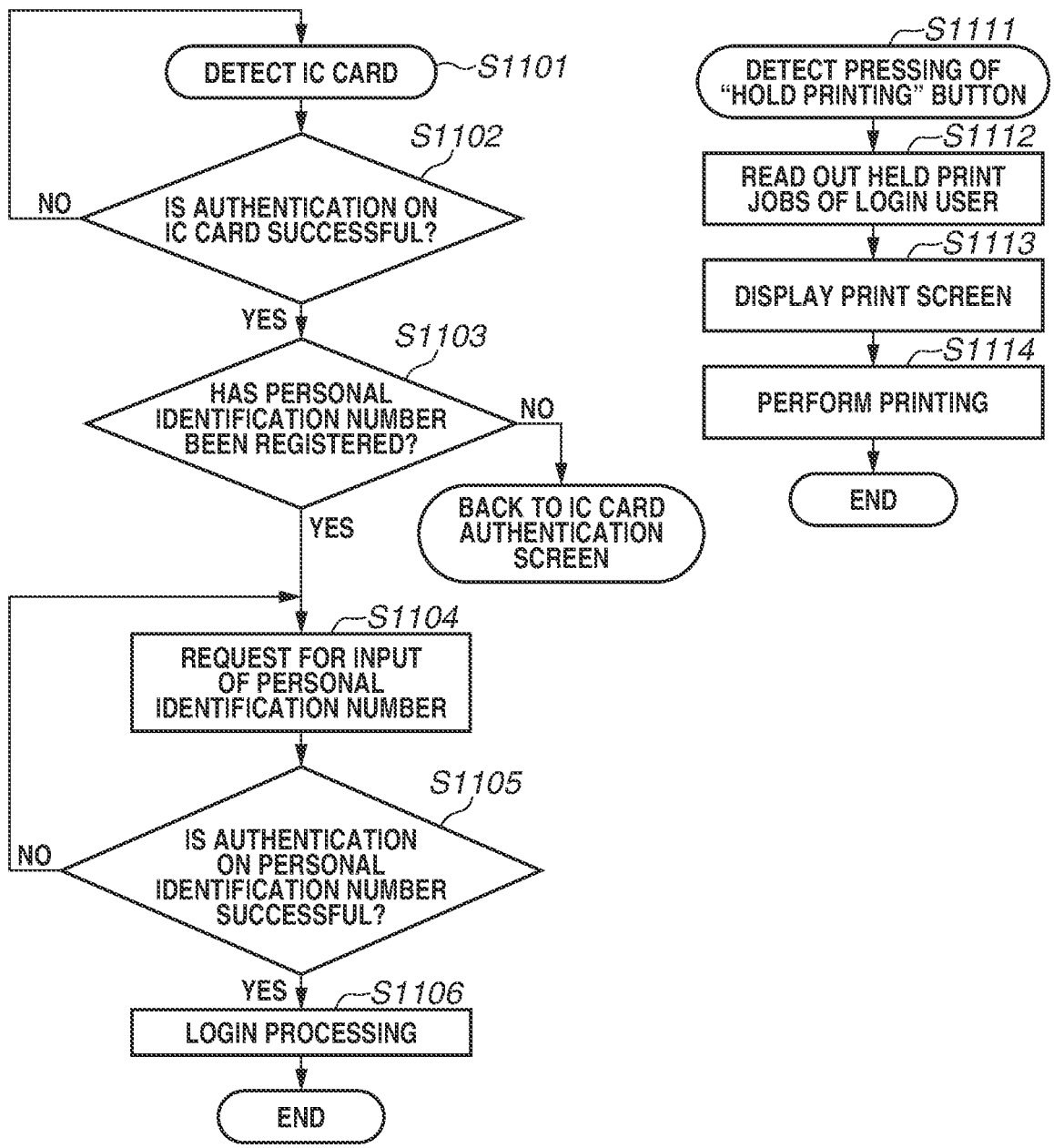
FIG. 11 is a flowchart illustrating an operation of printing a held print job from the local UI.

An operation flow of printing a held job from the local UI will be described with reference to FIGS. 10 and 11. FIG. 10 illustrates a screen displayed on the operation panel 205 by the local UI 301 and transition of the screen.

In the present exemplary embodiment, an example in which the multi-factor authentication is ON as the authentication setting of the local UI 301 in the area 404 and two authentication factors, which are an IC card and a personal identification number, are used as the authentication factors of the multi-factor authentication.

As for the authentication factors of the multi-element authentication, other authentication factors such as a one-time password can also be used in addition to an ID and a password.

The local UI 301 displays an IC card authentication screen 1001. The user authentication service 303 activates the IC card reader 209 by using the IC card reader driver 304 so that the IC card reader 209 can detect an IC card. In step S1101, the user authentication service 303 detects that an IC card has been held over the IC card reader 209 via the IC card reader driver 304. In step S1102, the user authentication service 303 acquires a card ID of the detected IC card, performs the authentication processing on the IC card by comparing the card ID with those registered in the user information table (Table 1), and determines whether the authentication is successful. In a case where the card ID is not registered (NO in step S1102), after displaying an authentication error, the local UI 301 displays the IC card authentication screen 1001 again. In a case where the card ID matches any one of the registered card IDs (YES in step S1102), the user authentication service 303 identifies the account associated with the card ID.

Next, in step S1103, the user authentication service 303 refers to the personal identification number of the determined account and determines whether the personal identification number has already been registered. In a case where the personal identification number has already been registered (YES in step S1103), the processing proceeds to step S1104. In step S1104, the user authentication service 303 displays a personal identification number input screen 1002 on the local UI 301 and requests the user to input the personal identification number. In a case where the personal identification number has not been registered yet (NO in step S1103), the user authentication service 303 displays an error screen and displays the IC card authentication screen 1001 again.

While not illustrated in the present proposal, an unregistered user can be requested to register a personal identification number. Next, in step S1105, the user authentication service 303 performs the authentication processing on the input personal identification number by checking the personal identification number to determine the authentication result. In a case where the input personal identification number is correct (YES in step S1105), the processing proceeds to step S1106. In step S1106, the user authentication service 303 performs processing for allowing the user to log in the MFP 101.

In a case where the authentication on the personal identification number fails (NO in step S1105), the processing returns to step S1104. In step S1104, the user authentication service 303 notifies the user that the personal identification number does not match by displaying a message on the local UI 301. In addition, the user authentication service 303 displays the personal identification number input screen 1002 again to request the user to input his or her personal identification number again. If failure of the authentication continues more than a certain number of times, the user authentication service 303 determines that the MFP 101 is being attacked and executes lockout of the account for a certain period of time.

In step S1106, the user authentication service 303 refers to the user information table (Table 1) and the role information table (Table 2), gives the role of the login user and the authority associated with the role, and performs control processing for allowing the user to log in the MFP 101. The user authentication service 303 displays a menu screen 1003 for allowing the user to use the function of the MFP 101 provided by the local UI 301 and ends the login processing. On the displayed menu screen 1003, a function(s) that the user is not allowed to use is grayed out so that the user cannot select the function(s).

In step S1111, the print service detects that a "Hold printing" button has been pressed on the menu screen 1003. Then, in step S1112, the print service reads out the held print jobs of the login user. In the reading processing, the print service refers to the held job list in Table 3 and reads the jobs having the job IDs corresponding to the user name. When displaying a hold printing screen 1004 in step S1113, the print service displays the jobs corresponding to the user name. Even if there is no corresponding job, the print service displays the hold printing screen 1004 having a blank job list. In step S1114, the user can select any of the jobs the user wishes to print on the hold printing screen 1004 and start printing by pressing a "Print" button. At this time, it is possible to impose printing restrictions in accordance with the role assigned to the authenticated user.

As described above, the MFP 101 according to the present exemplary embodiment can perform the multi-factor authentication on users remotely accessing the MFP 101. Further, even for image processing functions not supporting the multi-factor authentication, support methods are provided by providing options per service. Therefore, security measures can be taken in accordance with the environment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-011290, filed Jan. 27, 2021, which is hereby incorporated by reference herein in its entirety.

What is claimed is:

1. An image forming apparatus that includes a plurality of functions including at least a remote user interface (UI) function and an image processing function and that allows a user to use the plurality of functions upon accepting remote access from a terminal, the image forming apparatus comprising:
an authentication unit configured to perform authentication processing on remote access to the remote UI function and remote access to the image processing function,
wherein, in a case where the user remotely accesses the remote UI function, the image forming apparatus allows the user to use a function of the image forming apparatus by performing multi-factor authentication processing, and
wherein, in a case where the user remotely accesses the image processing function that does not support multi-factor authentication, the image forming apparatus allows the user to use a function of the image forming apparatus by performing processing different from the multi-factor authentication processing.

2. The image forming apparatus according to claim 1, wherein the image forming apparatus uses a first protocol for remote access to the remote UI function and uses a second protocol different from the first protocol for remote access to the image processing function.

3. The image forming apparatus according to claim 2, wherein the image forming apparatus performs, as the different processing, processing for rejecting remote access using the second protocol or authentication processing for authenticating a user performing remote access using a user ID and a password.

4. The image forming apparatus according to claim 1, wherein the image forming apparatus performs, as the different processing, processing for accepting remote access to the image processing function without performing the authentication processing.

5. The image forming apparatus according to claim 1, wherein the image forming apparatus performs, as the different processing, authentication processing in which remote access to an image processing function that does not support the multi-factor authentication is permitted when unique application authentication information is input.

6. The image forming apparatus according to claim 1, wherein the different processing performed on remote access to a print function that does not support the multi-factor authentication is processing for storing a received print job without performing print processing on the print job and performing the print processing on the stored print job when a user locally accesses a local UI function and gives an instruction.

7. The image forming apparatus according to claim 6, wherein the image forming apparatus allows the user to log in the image forming apparatus by performing the multi-factor authentication processing on local access to the local UI function and allows the user to use the function of the print processing.

8. The image forming apparatus according to claim 1, wherein, in a case of a setting in which the multi-factor authentication processing is not performed on remote access from the terminal, the image forming apparatus performs default remote access control processing on the image processing function.

9. A control method of an image forming apparatus that includes a plurality of functions including at least a remote UI function and an image processing function and that allows a user to use the plurality of functions upon accepting remote access from a terminal, the control method comprising:
performing authentication processing on remote access to the remote UI function and remote access to the image processing function,
wherein, in a case where the user remotely accesses the remote UI function, the image forming apparatus allows the user to use a function of the image forming apparatus by performing multi-factor authentication processing, and
wherein, in a case where the user remotely accesses an image processing function that does not support multi-factor authentication, the image forming apparatus allows the user to use a function of the image forming apparatus by performing processing different from the multi-factor authentication processing.

10. A non-transitory storage medium storing one or more programs including instructions, which when executed by one or more processors of an image forming apparatus that includes a plurality of functions including at least a remote UI function and an image processing function and that allows a user to use the plurality of functions upon accepting remote access from a terminal, cause the image forming apparatus to:
perform authentication processing on remote access to the remote UI function and remote access to the image processing function,
wherein, in a case where the user remotely accesses the remote UI function, the image forming apparatus allows the user to use a function of the image forming apparatus by performing multi-factor authentication processing, and
wherein, in a case where the user remotely accesses an image processing function that does not support multi-factor authentication, the image forming apparatus allows the user to use a function of the image forming apparatus by performing processing different from the multi-factor authentication processing.

* * * * *